(12) United States Patent
Simard et al.

(10) Patent No.: US 10,016,916 B2
(45) Date of Patent: Jul. 10, 2018

(54) STRUCTURAL FOAM AND MANUFACTURE THEREOF

(75) Inventors: Yan Simard, Sherbrooke (CA); Eric Lalancette, Sherbrooke (CA); Daniel Thomas Jones, Cowes, Isle of Wight (GB)

(73) Assignee: GURIT (UK) LTD., Newport (GB)

( * ) Notice: Subject to any disclaimer, the term of this patent is extended or adjusted under 35 U.S.C. 154(b) by 669 days.

(21) Appl. No.: 12/937,867

(22) PCT Filed: Mar. 16, 2009

(86) PCT No.: PCT/GB2009/000704
§ 371 (c)(1),
(2), (4) Date: Jan. 3, 2011

(87) PCT Pub. No.: WO2009/127803
PCT Pub. Date: Oct. 22, 2009

(65) Prior Publication Data
US 2011/0104478 A1    May 5, 2011

(30) Foreign Application Priority Data

Apr. 15, 2008  (GB) .................................. 0806816.5

(51) Int. Cl.
*B29C 44/34*    (2006.01)
*B29C 44/08*    (2006.01)
(Continued)

(52) U.S. Cl.
CPC .......... *B29C 44/352* (2013.01); *B29C 44/083* (2013.01); *B29C 44/3403* (2013.01);
(Continued)

(58) Field of Classification Search
CPC .............. B29C 44/083; B29C 44/3403; B29C 44/3423; B29C 44/352; B29C 44/353
(Continued)

(56) References Cited

U.S. PATENT DOCUMENTS 3,431,163 A * 3/1969 Gilbert ............................ 428/71
3,431,164 A * 3/1969 Gilbert ............................ 428/71
(Continued)

FOREIGN PATENT DOCUMENTS

CN   1121578   5/1996
CN   1748974   3/2006
(Continued)

OTHER PUBLICATIONS

Oct. 7, 2008 GB Search and Examination Report under Section 17 and 18(3) in related Application No. GB0806816.5.
(Continued)

*Primary Examiner* — Atul P. Khare
(74) *Attorney, Agent, or Firm* — Polsinelli PC; Therese A. Hendricks

(57) ABSTRACT

A method of manufacturing a foam body having an anisotropic cell structure, the method including the steps of: expanding a polymer at an elevated temperature to form an initial foam body; and cooling the initial foam body under a negative pressure. There is also provided a method of manufacturing a foam body having an anisotropic cell structure, the method including the steps of: (a) in a first expansion step, expanding a foamable polymer composition substantially isotropically to form an initial foam body having an isotropic cell structure; and (b) in a second expansion step, expanding the initial foam body anisotropically in a selected direction under a negative pressure which applies an expanding force in the selected direction to provide a final foam body having an anisotropic cell structure. Apparatus for the methods are also disclosed.

23 Claims, 6 Drawing Sheets

(51) Int. Cl.
  *B29C 44/56* (2006.01)
  *B29C 44/58* (2006.01)
  *B32B 3/26* (2006.01)
  *B29K 105/04* (2006.01)

(52) U.S. Cl.
  CPC ........ *B29C 44/353* (2013.01); *B29C 44/5627* (2013.01); *B29C 44/586* (2013.01); *B29C 44/3423* (2013.01); *B29C 2791/006* (2013.01); *B29K 2105/04* (2013.01); *Y10T 428/26* (2015.01)

(58) Field of Classification Search
  USPC ..................................................... 264/48, 55
  See application file for complete search history.

(56) References Cited

U.S. PATENT DOCUMENTS

| | | | | |
|---|---|---|---|---|
| 3,484,510 | A * | 12/1969 | Corazza | 264/51 |
| 3,734,870 | A * | 5/1973 | Schroeder et al. | 521/58 |
| 3,812,225 | A * | 5/1974 | Hosoda et al. | 264/54 |
| 4,154,785 | A * | 5/1979 | Inui et al. | 264/45.5 |
| 4,387,066 | A * | 6/1983 | Pip | B29C 44/083 249/160 |
| 4,656,074 | A * | 4/1987 | Conley | B32B 5/24 264/54 |
| 4,806,293 | A * | 2/1989 | Akiyama et al. | 264/53 |
| 5,575,871 | A | 11/1996 | Ryoshi et al. | |
| 5,955,015 | A * | 9/1999 | Scott et al. | 264/54 |
| 6,203,751 | B1 * | 3/2001 | Rolle et al. | 264/554 |
| 6,685,875 | B2 * | 2/2004 | Usui et al. | 264/554 |
| 7,052,634 | B2 * | 5/2006 | Liu | 264/54 |
| 7,067,082 | B2 * | 6/2006 | Chujo et al. | 264/321 |
| 2003/0225172 | A1 | 12/2003 | Miller et al. | |
| 2003/0236313 | A1 | 12/2003 | Pearce | |
| 2006/0061003 | A1 | 3/2006 | Hanada et al. | |

FOREIGN PATENT DOCUMENTS

| | | | |
|---|---|---|---|
| GB | 1060908 | A | 3/1967 |
| JP | 02022031 | A | 1/1990 |
| JP | 2004307578 | A | 11/2004 |
| JP | 2006233192 | A | 9/2006 |
| SU | 1199768 | A * | 12/1985 |

OTHER PUBLICATIONS

Oct. 20, 2009 International Search Report in corresponding PCT/GB2009/000704.

Feb. 22, 2013 Office Action in corresponding CN 2009801/9957.5; the CN Examiner has asserted the combination of D1 (CN1121578) in view of D2 (CN 1748974) referring to lines 5-44 of col. 5 in the Description of D1, and paragraphs [0039]—[0047] in the Description and Figures 3-4 in D2.

Aug. 30, 2012 GB Examination Report in corresponding Application No. GB0806816.5.

* cited by examiner

STRUCTURAL FOAM AND MANUFACTURE THEREOF

FIELD OF THE INVENTION

The present invention relates to anisotropic structural foam and to an apparatus and a method for manufacturing such a foam.

BACKGROUND

Structural foams are used in composite sandwich panels, with the foam sheet sandwiched between opposite outer skins of fibre composite material, to maximise the thickness of the composite sandwich panels, and consequently the panel stiffness, with minimum effect on panel weight. A sandwich panel can be likened to a steel I-beam in which the composite skins act as the I-beam flanges and the core material of structural foam acts as the shear web of the beam. During bending, one skin of the panel is put into compression and the opposite skin is put into tension. This induces a shear loading in the core material. Accordingly, the shear strength and stiffness are critical properties of the core material to prevent excessive deflection and maintain structural integrity.

A high compressive modulus can help prevent localised dimpling from minor impacts and a high compressive strength is often required to withstand loads from through thickness fixings or support points. In larger panels, foam sandwich panels also have to be designed to be resistant to buckling, which can become the major design driver. To prevent localised skin wrinkling, it is important to have a high compressive modulus and high shear modulus to prevent core shear buckling and shear crimping effects. Such composite sandwich panels are used in highly engineered structural members, for example wind turbine blades, that are subjected to demanding mechanical loads in use and so require optimised mechanical properties.

The properties of any polymeric foam core material are highly dependant on the density of the foam, the properties of the base polymer and the microstructure of the cellular arrangement. It is highly desirable to achieve variable properties with fixed foam density and polymer type, i.e. by influencing or modifying the foam microstructure.

The Applicant currently manufactures and sells a structural foam product, known as Corecell (Registered Trade mark). There are several derivatives of the basic foam which are all based on Styrene-Acrylonitrile (SAN) polymer, which provides a unique blend of strength, stiffness and elongation. It is both difficult and very time consuming to modify the polymer composition of the foam in an attempt to modify the mechanical properties of the foam to a selected target.

It is commonly known, however, that inducing anisotropy in the cellular microstructure of a foam can influence mechanical properties. It is known that, the mechanical properties of a foam can vary with cell orientation of the foam.

The anisotropy index (AI) is a numeric parameter that allows characterization of cell orientation of a foam. The knowledge of orientation is very useful because it can be used as an indicator of mechanical properties.

A structural foam is typically made by forming an initial unfoamed embryo which is then transformed into a body of foam in a mould cavity of predefined dimensions. The theoretical AI is calculated from the initial embryo size and the dimensions of the mould cavity.

Various parameters discussed herein are defined as follows:

$$\text{Anisotropy index in the length (or Width) direction} = \text{Thickness expansion ratio/Length (or Width) expansion ratio} \quad (1)$$

$$\text{Thickness expansion ratio} = \text{Thickness of foam/Thickness of embryo} \quad (2)$$

$$\text{Length expansion ratio} = \text{Length of foam/Length of embryo} \quad (3)$$

$$\text{Width expansion ratio} = \text{Width of foam/Width of embryo} \quad (4)$$

When the anisotropy index equals 1, the growth of cells is the same in all directions and their shape is round, i.e. spherical. In this case, the cells are isotropic. When the anisotropy index is below 1, the growth of cells is larger in the length (or width) direction compared to the thickness direction. If the anisotropy index is above 1, the growth of cells is larger in thickness direction compared to length direction (or width direction).

So for a sheet having two major opposite planar surfaces, an AI of greater than 1 indicates greater expansion in the thickness direction of the sheet than in the plane of the sheet, and an AI of less than 1 indicates greater expansion in the plane of the sheet than in the thickness direction.

Most currently available foams exhibit some degree of anisotropy, but this is usually not controlled and is a direct result of the manufacturing process used to produce the foam. Often the foam is isotropic in one plane, for example the plane parallel to the major opposed planar surfaces of a sheet, but exhibits different properties perpendicular to that plane.

A known commercially produced foam sold under the trade name Corecell exhibits an anisotropic index (AI) of 0.85-1.0, which means the cells are elongated in the planar direction of the sheet.

According to theory, by inducing an anisotropic index of greater than 1 (AI >1), in which the cells are elongated in the rise, or thickness, direction, this would improve the mechanical properties of the foam.

Some currently commercially available foams contain a degree of anisotropy, although it is not necessarily known in the state of the art how such foams were specifically manufactured to exhibit such anisotropic properties, or in particular whether or not the anisotropic properties are controllably and reliably introduced or are an "accidental" result of production methods.

Some commercial foams may have AI values greater than 1 but less than 1.4. Such foams can exhibit superior mechanical properties. Foams manufactured by continuous extrusion techniques, often have AI <1, as they tend to be susceptible to cellular alignment in the extrusion direction. It is then possible to bond the extruded sheets together and cut the bonded assembly in a direction perpendicular to the alignment direction. By rotating the axis of the foam, to provide major cut faces of a sheet which are orthogonal to the extrusion direction, this could introduce AI >1 through the thickness of the foam sheet. However, this would be a laborious and expensive manufacturing technique.

One typical current foam manufacturing process involves cooling the expanded foam under an applied pressure within a press apparatus, the cooling/pressing operation occurring after expansion of the foam. This achieves dimensional control of the moulded expanded foam product.

SU-A-1199768 discloses a polystyrene foam production process including preliminary foaming of polystyrene granules, ageing of foamed granules, filling a mould with the granules, moulding them, cooling in the enclosed volume of the mould and extracting the finished product from the mould. The cooling stage is carried out at a mould working volume increased by 10-40% as compared with the initial volume, and after the increase in mould volume, cooling is carried out under a vacuum. JP-A-2004/305708 discloses a foam-moulding method. GB-A-1060908 discloses forming expanded foam articles in an evacuated mould. JP-A-2006/233192 discloses polylactic foamed articles. US-A-2003/236313 discloses making foamed elastomer gels in which various moulding/heating/cooling steps may be with or without a vacuum, as desired. None of these documents discloses the production of anisotropic foams or addresses the problem of producing foams having high shear strength and stiffness, and high compressive modulus and high shear modulus.

The present invention aims at least partially to overcome these problems of known foams and their manufacturing techniques.

SUMMARY OF THE INVENTION

The present invention provides a method of manufacturing a foam body having an anisotropic cell structure, the method comprising the steps of: (a) expanding a polymer at an elevated temperature to form an initial foam body; and (b) cooling the initial foam body under a negative pressure which is applied anisotropically to the foam body, the negative pressure applying an anisotropic expansion force to the cells of the foam body to provide a final foam body having an anisotropic cell structure.

The present invention further provides a polymeric expanded foam body in the form of a sheet having two opposite major surfaces formed by moulding and the cell dimension in a thickness direction between the opposite major surfaces of the sheet is at least 1.1 times greater than the cell dimension in a width or length direction of the sheet.

The present invention further provides an apparatus for manufacturing a foam body having an anisotropic cell structure, the apparatus comprising an initial mould defining a first mould cavity, a heating device for heating the first mould cavity whereby in the initial mould a polymer can be expanded at an elevated temperature to form an initial foam body, a final mould defining a second mould cavity, and a vacuum device for applying a negative pressure across the second mould cavity in a selected direction, the final mould having a dimension larger than a corresponding dimension of the initial mould in the selected direction to provide a final expanded foam body having an anisotropic cell structure and a cell anisotropy index of greater than unity.

The present invention further provides an apparatus for manufacturing a foam body having an anisotropic cell structure, the apparatus comprising a common mould having a fixed mould member and a movable mould member defining a mould cavity, the movable mould member being selectively movable relative to the fixed mould member from a first position, defining a first mould cavity volume having a first distance in a selected direction, to a second position, defining a second mould cavity volume having a second distance in the selected direction, the second distance being larger than first distance, a heating device for selectively heating the mould cavity, and a vacuum device for selectively applying a negative pressure across the mould cavity in the selected direction.

In the present invention, the applicant has developed a method of modifying the cellular microstructure in a cellular expanded foam, in particular, in one embodiment, a commercial foam sold under the trade name Corecell, such that the mechanical properties of the foam can be enhanced by controlling, or controllably inducing, a degree of anisotropy in the cellular structure of the foam. The mechanical properties may vary depending upon the degree of anisotropy that is induced.

In the preferred process according to the present invention, the pressing apparatus of the current foam manufacturing process described above is not employed, and instead a vacuum chamber is utilised. The expanded foam, typically in the form of a sheet, is placed immediately into the vacuum chamber after the previous expansion step. The polymer composition of the foam is at a temperature above its glass transition temperature so that the polymer material can be deformed during at least a part of the subsequent step, in particular by being permitted to expand further due to the action of the cellular foam forming process, for example using a blowing agent.

The expanded foam is then cooled under vacuum. In this specification, the term "vacuum" means a negative pressure and does not imply that a full vacuum is achieved, although the use of a full vacuum is within the ambit of the present invention. The progressively cooling foam is oriented relative to gravity and relative to the application of vacuum so that the vacuum applies an expansion force to the major surfaces of the sheet which prevents collapse of the foam in the thickness direction of the sheet, which would otherwise occur under the effect of gravitational force.

In addition, the vacuum can, in some embodiments, apply a sufficiently large expansion force to the major surfaces of the expanded foam sheet so that the expansion force can overcome any effect of collapse due to gravity so as actually to apply a positive anisotropy to the foam by expanding the cells of the foam in a direction which is, or has a component which is, in the thickness direction that is orthogonal to the opposed major planar surfaces of the sheet. In other words, the vacuum can apply a positive stretching or elongating force to the cells of the foam so as to stretch or elongate them in a thickness direction of the foam. This drawing of the foam in a selected direction causes an increase in the mechanical properties of the foam.

The vacuum chamber, or a mould within the vacuum chamber, is dimensioned so as to permit such expansion or stretching of the foam to achieve the desired anisotropy index. This may be achieved by having a single mould for the primary expanding and subsequent vacuum cooling steps, or two moulds, one for each step, with the mould cavity for the subsequent vacuum cooling step being larger in the thickness direction than the mould cavity for the primary expanding step.

Experimental work by the inventors has allowed the relationship of mechanical properties to anisotropy to be empirically derived to provide an estimate of theoretical mechanical properties for a given anisotropy index when an expanded polymer foam is subjected to particular expansion conditions. It has been found that there is a correlation between theoretical anisotropic index (AI) and the measured AI for some examples. A relationship has been found between the mechanically measured bulk anisotropy index and the observed cellular anisotropy index at the microscopic level.

The present invention provides a number of advantages and technical benefits, most particularly permitting the development of foams, which have the same polymer composition as known foams, such as the Corecell foam, or alternative structural foams, which have improved static mechanical properties.

A foam having an enhanced anisotropy index can exhibit enhanced mechanical properties, specifically compression strength, shear strength and shear modulus. The present invention provides an ability to modify and alter the mechanical properties of a foam without changing the base chemistry of the foamed polymer composition. This has the technical advantage of being able to improve the specific properties without the need to use a more rigid cross-linked polymer which typically would result in a more brittle foam with lower fatigue and impact performance.

The present invention utilises the technical concept of deliberately introducing an AI of greater than 1, and typically less than 1.5, into batch manufactured polymeric foam. This provides the ability to extend the technical and commercial competitiveness of a foam without reformulation or chemical modification of the chemical composition of the foam (or the blowing agent).

BRIEF DESCRIPTION OF THE DRAWINGS

Embodiments of the present invention will now be described, by way of example, with reference to the accompanying drawings, in which.

DETAILED DESCRIPTION

Figure 1:
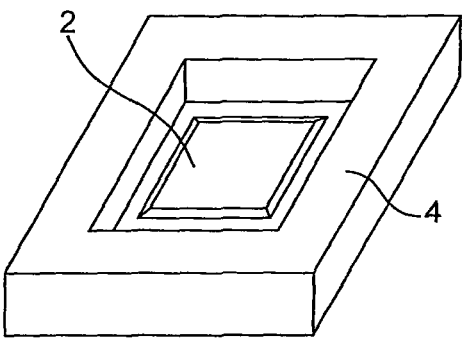
FIG. 1 is a schematic diagram showing an apparatus, and a moulding sequence, for producing an anisotropic structural foam in accordance with a first embodiment of the present invention.
Figure 1:
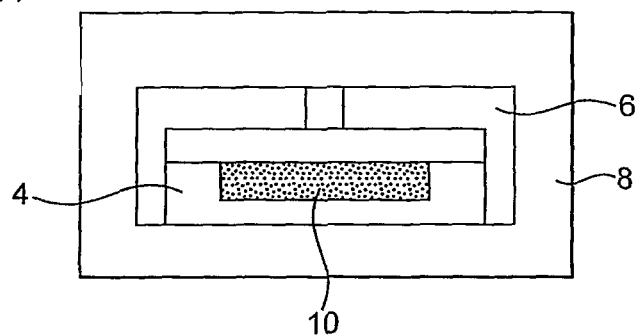
Figure 1:
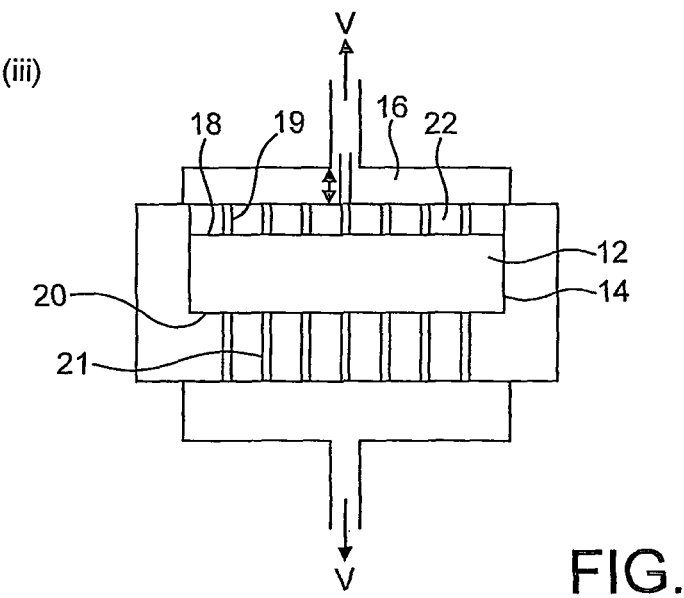

Referring to FIG. 1, there is shown an apparatus and sequence of method steps to produce an anisotropic structural foam in accordance with first embodiment of the present invention.

Initially, there is provided a foam embryo 2, composed of a polymeric material, for example a styrene-acrylonitrile (SAN) polymer, or any other suitable polymer known for use in the manufacture of polymeric foams by using embryos. The embryo 2 contains a blowing agent, for example azobisisobutyronitrile (AZDN) and acetone, in a known manner. The embryo 2 has been shaped, for example cut and sanded, to a predetermined shape and dimension is provided. The embryo 2 is unexpanded, but, in a known manner, includes a blowing agent that, when activated and/or when the polymeric material is heated above its glass transition temperature so that the polymeric material can readily deform under an applied load, for example from the expanding blowing agent, can expand to form a cellular foam, including closed cells.

In step (i) shown in FIG. 1, the embryo 2 is disposed within a mould 4 which determined the maximum dimensions of the length (x), width (y) and height (z) of the embryo 2 during an initial foam expansion step at elevated temperature above the glass transition temperature of the polymer material of the foam embryo. In step (ii) shown in FIG. 1, the mould 4 containing the embryo 2 is disposed within a heating chamber 6 of a heating device 8 to cause the embryo 2 to expand to form an expanded foam body 10. After the expiry of a predetermined period to achieve the desired shape and dimensions for the expanded foam, the expanded foam body 10 is removed from the heating device 8. In step (iii) shown in FIG. 1, the expanded foam body 10 is subsequently transferred into a vacuum cooling chamber 12. The vacuum cooling chamber 12 defines a mould cavity 14 of prescribed length, width and height.

A vacuum system 16 is provided to create a negative pressure across the opposed major surfaces 18, 20 of the vacuum cooling chamber 12 by applying a vacuum V through vacuum holes 19, 21 in the opposed major moulding surfaces 18,20. The vacuum cooling chamber 12 is typically part of a hydraulic press 22, in which the press 22 can be operated to control the vertical dimension of the mould cavity 14 of the vacuum cooling chamber 12, thereby selectively to control the anisotropy index of the resultant foam.

After the expanded foam body 10 has been put into the vacuum cooling chamber 12, the foam continues to expand and is then allowed to cool. The application of vacuum across the major surfaces 18, 20 via the vacuum system 16 either prevents partial cell collapse in the vertical direction during cooling of the foam cells under the action of gravity, or alternatively applies a positive stretching force in the vertical direction so as further selectively to elongate the foam cells in the vertical direction. Such selective vertical expansion, in the z direction, under vacuum occurs after the primary expansion step when the embryo was heated and expanded within the mould 4 in which the foam cells were expanded in all of the x, y and z directions. This selective vertical expansion in the subsequent vacuum cooling step introduces an enhanced anisotropy index within the foam.

Therefore there are two successive expansion steps, a first primary expansion step under applied heating in which the foam is expanded in three orthogonal directions, preferably substantially isotropically, and a second additional expansion step under cooling in which the foam is initially, in a first phase, expanded under vacuum in one selected direction to introduce an anisotopic foam cell structure, using the heat from the previous step to retain the temperature of the polymeric material above the Tg of the polymeric material so as to permit the second expansion of the foam, and subsequently, in a second phase, that anisotopic foam cell structure is set by cooling the polymeric material below the Tg of the polymeric material to form a solid foam body having a desired anisotopic foam cell structure which exhibits enhanced mechanical properties.

The initial foam body is preferably transferred from the oven to the vacuum chamber within a period of no more than about 3 minutes, to retain sufficient heat within the initial foam body to achieve subsequent expansion under vacuum. Preferably, the initial foam body is formed in an oven at a temperature of at least 100 C. Preferably, the cooling under negative pressure is conducted for a period of at least 15 minutes. Preferably, the cooling under negative pressure is conducted at a temperature of up to 30° C.

The negative pressure is preferably at least 15 N/m2 absolute, more preferably from 15 to 100 N/m2 absolute, yet more preferably from 45 to 80 N/m2 absolute. In practice, the negative pressure is determined by measuring the actual applied negative pressure, for which zero negative pressure, i.e. atmospheric pressure, would correspond to $101 \times 10^3$ N/m$^2$ (29.92 inches of Hg).

The applied vacuum (applied negative pressure) should typically be higher than about $51 \times 10^3$ N/m$^2$ (15 inches of Hg), typically about $68 \times 10^3$ N/m$^2$ (20 inches of Hg) to obtain an A.I. higher than 1.12. If the vacuum is increased, then the A.I. may be increased. The width ratio at a vacuum pressure higher than $68 \times 10^3$ N/m$^2$ (20 inches of Hg) is less critical than at lower pressure (i.e. higher vacuum).

It is not necessary to control the width of the partly expanded foam to precise tolerances as the foam is transferred into the cooling vacuum chamber because the width gain in the vacuum chamber is not particularly high due to the application of the expansion force in the thickness direction. By increasing the A.I. to 1.12, the length and the width of the foam block tend to decrease in the vacuum chamber. The mould temperature is typically from 20° C. to 25° C. and any variation in anisotropic index within that range was found not to be significant. The temperature in the vacuum cooling chamber must be low enough to minimize the cooling time for production purposes, and the quantity of heat within the initially expanded foam as the foam enters the vacuum chamber is material to the length of the cooling time within the vacuum chamber.

Figure 2:
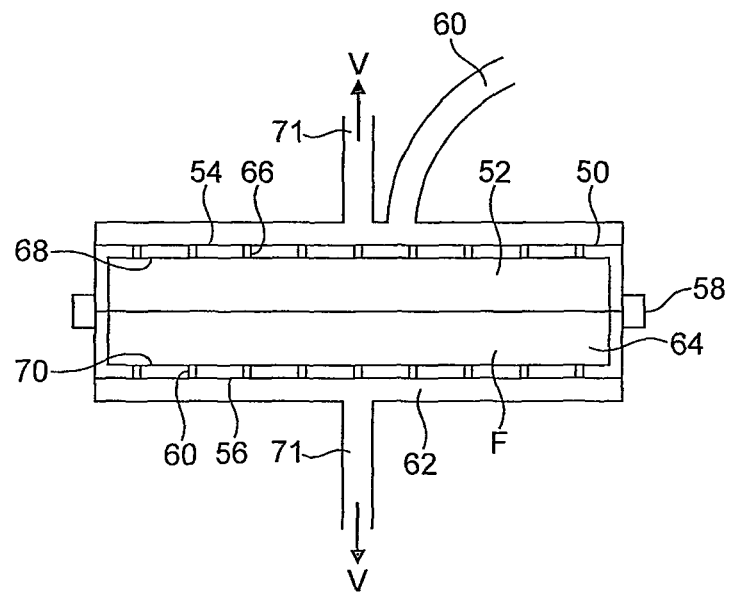
FIG. 2 is a schematic drawing of an apparatus for producing an anisotropic structural foam in accordance with a second embodiment of the present invention.

Referring to FIG. 2, an alternative moulding apparatus is illustrated in accordance with a second embodiment of the present invention. In this apparatus, a tool 50 defines a mould cavity 52, and the tool 50 includes two mould halves 54, 56 which can be separated selectively to open the mould. A selectively openable and closable perimeter seal 58 is provided between the mould halves 54, 56. An injection device 60 is provided for injecting partially pre-expanded foam beads into the mould cavity 52, for example using a known standard air conveyor. The beads may be composed of polystyrene or polypropylene, or any other suitable polymer known for use in the manufacture of polymeric foams by using pre-expanded beads. The beads contain a blowing agent, for example pentane, in a known manner. Sufficient blowing agent is provided to ensure that there is sufficient gas pressure from the vaporised blowing agent during the subsequent moulding process to achieve strong welding together of the beads to form a solid unitary foam body having good mechanical properties.

On injection of the partially pre-expanded foam beads B into the mould cavity 52, the perimeter seal 58 between the mould halves 54, 56 permits displaced air to escape therefrom as the beads progressively fill, in an amount up to the desired bead volume, into the mould cavity 52. The tool 50 is closed and the perimeter seal 58 is correspondingly closed.

Then, a steam injection system 62 is employed to inject high pressure steam into the mould cavity 64 using through vent holes 66 provided in the mould surfaces 68, 70. The steam causes the beads B to expand further to form a solid foam block F.

The apparatus of the embodiment of the invention also includes a vacuum applying apparatus 71 which is adapted to apply a vacuum V across the mould cavity 52 by the vacuum being applied to the major surfaces 68, 70 of the mould. Such a vacuum causes, as discussed earlier, selective stretching of the foam in the vertical direction and also removes volatiles, for example from the foaming agent, from the mould cavity 52. The perimeter seal 58 is adapted to withstand the applied vacuum pressure.

Furthermore, the opposed major faces 68, 70 of the mould may be relatively movable towards and away from each other. This permits the mould cavity 52 dimension in the vertical direction to be expandable so that during the application of the vacuum, the foam can be stretched further from an initial moulded shape to a final moulded shape as a result of the application of the vacuum stretching force across the major surfaces.

Figure 3A:
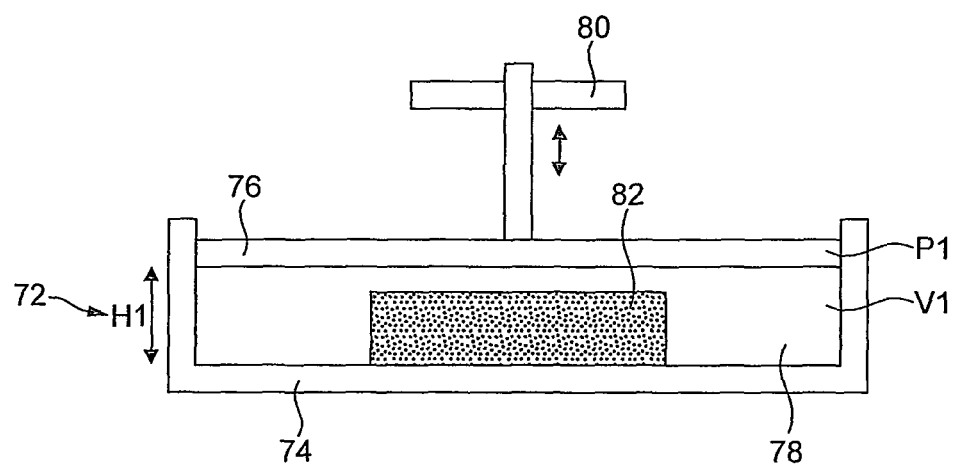
FIG. 3 is a schematic diagram showing an apparatus, and a moulding sequence, for producing an anisotropic structural foam in accordance with a third embodiment of the present invention.
Figure 3B:
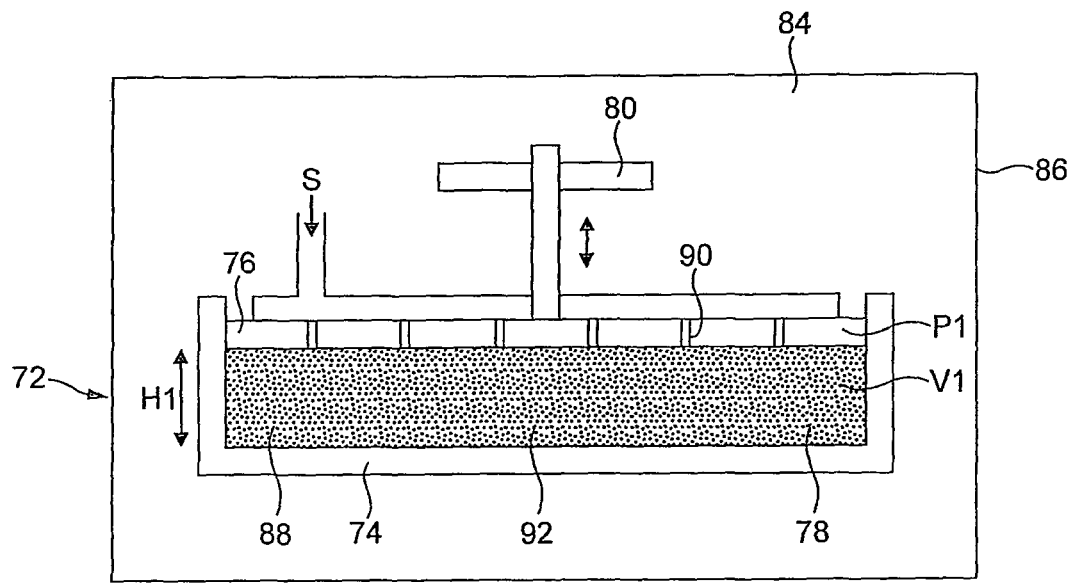

Referring to FIGS. 3 (a), (b) and (c) there is shown an apparatus and sequence of method steps to produce an anisotropic structural foam in accordance with third embodiment of the present invention.

Figure 3C:
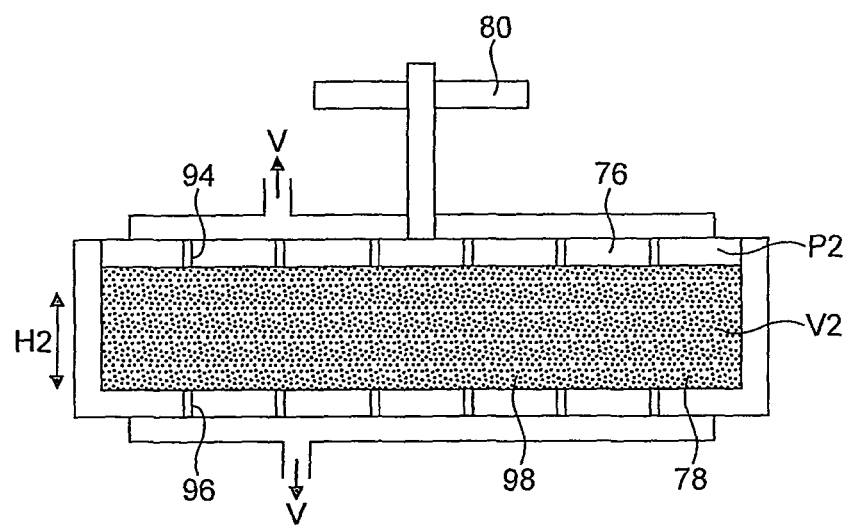

Referring first to FIG. 3 (a), a moulding apparatus 72 comprises a fixed female mould member 74 and a movable male mould member 76 that is reciprocally and slidingly received within the female mould member 74 to define a mould cavity 78 therebetween. The male mould member 76 is selectively movable, by a moving mechanism 80, in a direction inwardly and outwardly of the female mould member 74 so as to reduce or enlarge, respectively, the height of the mould cavity 78. The moving mechanism 80 is adapted to dispose the male mould member 76 selectively at a desired vertical position, and preferably in a selected one of two indexable vertical positions. A first vertical position P1, shown in FIGS. 3 (a) and 3(b), corresponds to a smaller mould cavity volume V1 and height H1 and a second vertical position P2, shown in FIG. 3(c), corresponds to a larger mould cavity volume V2 and height H2.

In use, in a first step (i) shown in FIG. 3(a), a foamable polymeric material 82 to form an expandable foam body is disposed within the moulding apparatus 72, and in particular within the female mould member 74. The polymeric material 82 may comprise either of two forms, namely an embryo, as in the first embodiment, or a plurality of partially pre-expanded foam beads, as in the second embodiment, which are injected into the mould cavity 78. The expanded beads are injected into the mould cavity 78 using a standard air conveyor apparatus, in a known manner.

Then, the moving mechanism 80 disposes the male mould member 76 at the first vertical position P1, which corresponds to the smaller mould cavity volume V1 and height H1.

In a second step shown in FIG. 3 (b), which is a first expansion step, the mould cavity 78 of the moulding apparatus 72 containing the foamable polymeric material 82, in the form of the embryo or partially pre-expanded foam beads, is provided with heat to cause the polymeric material 82 to form a foam by volatilisation and expansion of a blowing agent therein, such as pentane. For example, the moulding apparatus 72 may be disposed within a heating chamber 84 of a heating device 86 to cause the embryo to expand to form an expanded foam body 88. Alternatively, steam S may be injected into the mould cavity 78 through injection holes 90 (for clarity these are not shown in FIGS. 3 (a) and 3(c)) to cause the partially pre-expanded foam beads to expand. In either case, there is formed, after the expiry of a predetermined period to achieve the desired shape and dimensions, having a volume V1 and height H1, an expanded foam body as an intermediate product 92.

In step (iii) shown in FIG. 3(c), the moving mechanism 80 then disposes the male mould member 76 at the second vertical position P2, which corresponds to a larger mould cavity volume V2 and height H2. Vacuum V is applied to the mould cavity 78 through vacuum holes 94, 96 (for clarity these are not shown in FIGS. 3 (a) and 3(b)) in the major moulding surfaces of the female mould member 74 and the male mould member 76 so that a drawing force, acting against gravitational force, is applied vertically across the height of the cavity 78 by the negative pressure. The intermediate product 92 is still initially above the Tg of the polymeric material and so the foam can continue to expand selectively upwardly to fill the enlarged cavity having increased height, and induce anisotropy into the foam cell structure. No additional heat is applied in this step and the polymeric material is allowed to cool below the Tg of the polymeric material to set the foam cell structure of the final expanded foam body 98. The cooling is typically carried out at room temperature (about 20 to 25 degrees C.), but additional cooling of the moulding apparatus 72 may be employed, for example flow of coolant through conduits within the mould members 74, 76.

Again, there are two successive expansion steps, a first primary expansion step under applied heating in which the foam is expanded in three orthogonal directions, preferably substantially isotropically, and a second additional expansion step under cooling in which the foam is initially, in a first phase, expanded under vacuum in one selected direction to introduce an anisotopic foam cell structure, using the heat from the previous step to retain the temperature of the polymeric material above the Tg of the polymeric material so as to permit the second expansion of the foam, and subsequently, in a second phase, that anisotopic foam cell structure is set by cooling the polymeric material below the Tg of the polymeric material to form a solid foam body having a desired anisotopic foam cell structure which exhibits enhanced mechanical properties. In this embodiment, the two expansion steps are carried out in a single moulding apparatus having a movable mould portion so as to define two cavity heights, the lower height being the height of the initially formed intermediate product expanded in three directions and the greater height being the height of the final product which has additionally been expanded anisotropically in a selected one direction.

The embodiments of FIGS. 1, 2 and 3 permit relatively long cooling periods, which are required when foams having relatively high density are to be manufactured.

Figure 4:
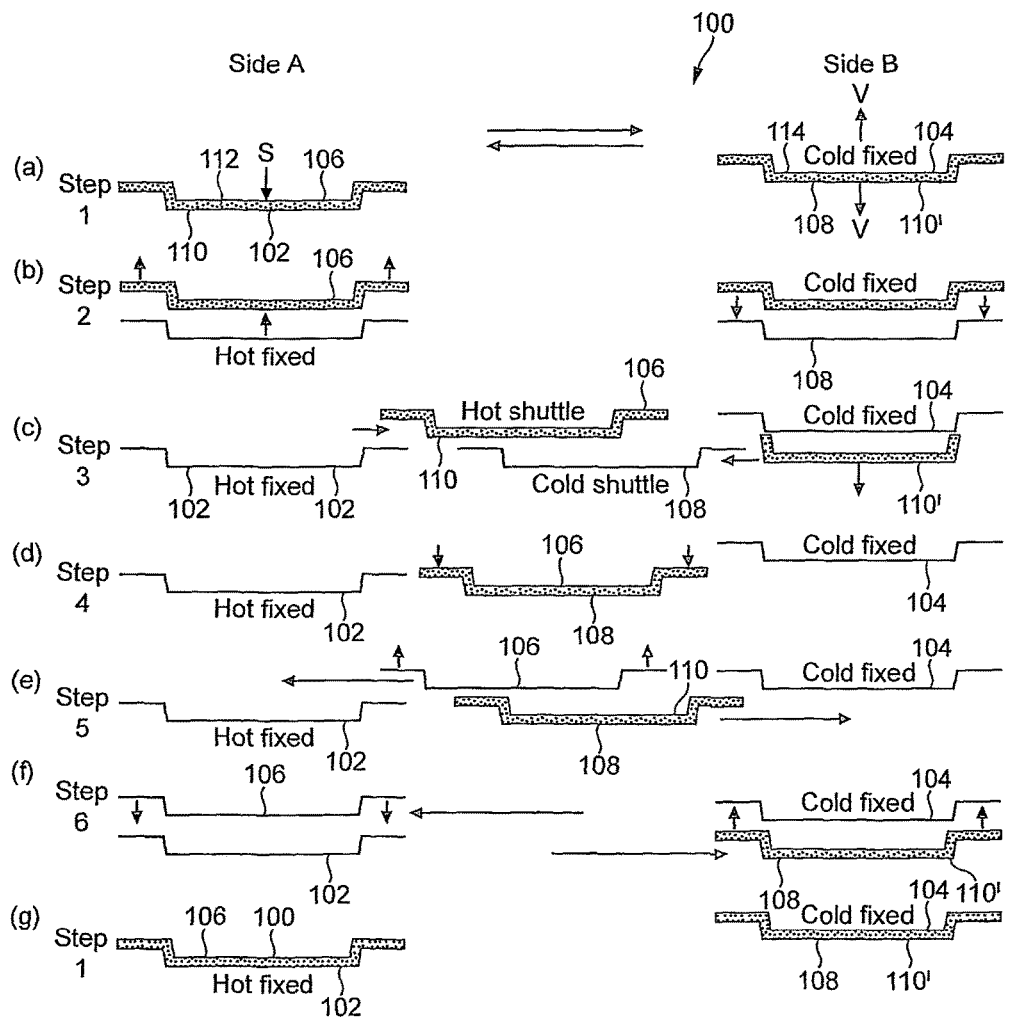
FIG. 4 is a schematic diagram showing an apparatus, and a moulding sequence, for producing an anisotropic structural foam in accordance with a fourth embodiment of the present invention.

Referring to FIG. 4, in a further alternative embodiment a shuttle tool method is provided. The embodiment of FIG. 4 is more suited to the manufacture of foams having relatively low density, because the shuttle system permits only relatively short cooling periods, substantially equal to an injection moulding period. It is known to use a Hirsch expanded foam moulding process featuring a shuttle system between a hot tool and a cold tool to speed up the injection and cooling stages for the manufacture of foam, in particular expanded polystyrene and expanded polypropylene. A current foam body is moulded in the hot mould while a previously moulded foam body is cooled in the cold mould. In the known Hirsch moulding machine and process, the hot and cooling moulds are the same size to provide the same cavity.

However, in accordance with the present invention, different sized hot and cold tools can be used to develop an anisotropy index by increasing the cavity dimension within the cold tool as compared to the hot tool in order to elongate the foam body under vacuum in the cold tool while the polymer material is still above its glass transition temperature ($T_g$). This causes stretching of the foam within the cold mould and then subsequently sets the foamed body in a stress free condition as the foam body cools back beneath the glass transition temperature.

As shown in FIG. 4, the shuttle apparatus 100 includes two sides, side A and side B. Side A includes a hot fixed mould 102 and side B includes a cold fixed mould 104. A hot shuttle 106 is provided which moves between side A and a central location C between sides A and B, and there is also provided a cold shuttle 108 which moves between the cold side B and the central location C between sides B and A. The hot shuttle 106 and the cold shuttle 108 are complementary. In the embodiment, the hot shuttle 106 comprises an upper mould and the cold shuttle 108 comprises a lower mould defining, the hot fixed mould 102 being a lower mould and the cold fixed mould 104 being an upper mould. The hot mould defines a hot cavity 112 and the cold mould defines a cold cavity 114.

As shown in FIG. 4(a), while an expanded foam body 110 is being injected and moulded within the hot cavity 112 on the hot side A in the hot mould consisting the hot shuttle 106 and the hot fixed mould 102, a previously moulded expanded foam body 110' is being cooled under vacuum V on the cold side B in the cold cavity 114 of the cold mould consisting of the cold fixed mould 104 and the cold shuttle 108.

On the hot side A, partially pre-expanded foam beads are injected between the hot fixed mould 102 and the hot shuttle 106. The expanded beads are injected into the hot mould using a standard air conveyor apparatus, in a known manner. When the hot mould closes, the elevated temperature causes further expansion of the beads under the action of the blowing agent, which in turn causes the beads to be welded together and entirely fill the hot cavity 112 to form the solid expanded foam body 110 of predetermined shape and dimensions defined by the moulding surfaces of the hot shuttle 106 and the hot fixed mould 102. High pressure steam S may be injected into the hot mould cavity 112 through vent holes (not shown) within the moulding surfaces. The hot mould is then opened by separating the hot fixed mould 102 and the hot shuttle 106.

The vacuum expansion on the cold side B of the preliminarily moulded expanded foam body 110 previously formed on the hot side A is described below. In accordance with the embodiment of the present invention, the apparatus and method of the Hirsch process are modified so as to provide vacuum cooling on the cold side B that further selectively expands, in the thickness direction, the foam body 110' that is within the cold mould. The hot foam body 110 in the form of a sheet is transported to the cooling side B which has a larger thickness dimension for the cold cavity 114 as compared to the hot cavity 112. The cold fixed mould 104 and the cold shuttle 108 are then closed to provide a larger controlled dimension between the major mould surfaces, the thickness direction typically being oriented in a vertical direction, although other inclined orientations may be employed. A vacuum is then applied to the cold cavity 114 to stretch the foam body 110' in the thickness direction. The vacuum also acts to remove volatile materials from the cold cavity 114. The vacuum is therefore used to elongate the foam cells of the foam body 110', as compared to the known process in which the vacuum merely acts to cool the pre-expanded foam body within, and to remove volatile materials from, the cold mould.

Figure 5:
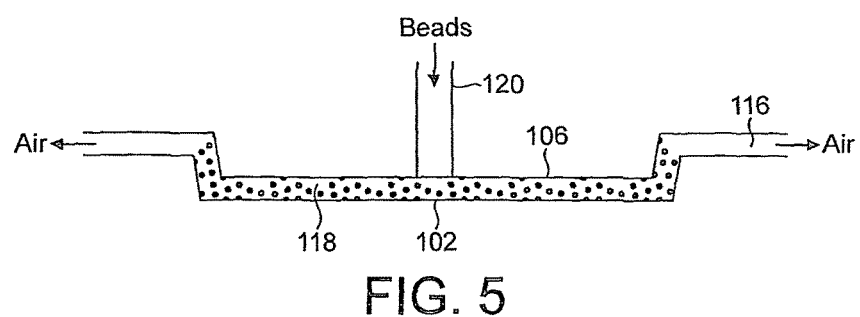
FIG. 5 is a schematic drawing of the hot mould in the apparatus of FIG. 4.

The injection and moulding on the hot side A is described below with reference to FIG. 5. The Hirsch process may be further modified in accordance with this embodiment so that on the hot side A when the hot mould closes, the hot mould is initially, in a first closing phase, only partially closed. This provides a peripheral air gap 116 between the hot shuttle 106 and the hot fixed mould 102. The air gap 116 is provided to allow displaced air to escape between the mould halves constituted by the hot shuttle 106 and the hot fixed mould 102, but to prevent escape of any pre-expanded beads 118 which have been injected between the hot fixed mould 102 and the hot shuttle 106. The pre-expanded beads 118 are injected into the hot mould by the air conveyor apparatus 120. The air escapes through the air gap 116 between the hot fixed mould 102 and the hot shuttle 106. In second closing phase, the hot fixed mould 102 and the hot shuttle 106 are then closed to a fully closed moulding configuration as shown in FIG. 4(g). High pressure steam may then be injected into the mould cavity using vent holes within the tool surface. The beads then expand to form a solid foam. The hot tool is then opened by separating the hot fixed mould and the hot shuttle.

In a subsequent step, as shown in FIG. 4(b) the hot shuttle 106 is lifted from the hot fixed mould 102 carrying the moulded expanded foam body 110 and the cold shuttle 108 is lowered downwardly from the cold fixed mould 104 carrying the cooled previous moulding 110'.

Then, simultaneously, as shown in FIG. 4(c), the hot shuttle 106 carrying the hot foam body 110 is moved laterally to the central location C and the cold shuttle 108, which is empty, is also moved to the central location C. After the cold shuttle 108 has moved downwardly and laterally away from the cold fix mould 104, the previously moulded expanded foam body 110' is ejected from the cold fixed mould 104 as a finished part.

As shown in FIG. 4(d), then the hot shuttle 106 carrying the hot foam body 110 is moved downwardly so as to mate with the cold shuttle 108 at the central location C. This deposits the foam body 110 into the cold shuttle 108.

Subsequently, as shown in FIG. 4(e), the hot shuttle 106 is moved upwardly to separate from the foam body 110 and the cold shuttle 108, and then the hot shuttle 106, without the foam body 110, is moved laterally back to a position above the hot fixed mould 102 as shown in FIG. 4(f). Simultaneously, the cold shuttle 108 carrying the foam body 110 is moved laterally under the cold fixed mould 104 to the position shown in FIG. 4(f). Then, as shown in FIG. 4(g), the hot shuttle 106 is moved downwardly into mating engagement with the hot fixed mould 102 and the cold shuttle 108, carrying the hot foam body 110 to be cooled on the cooling side B, moves upwardly into mating engagement with the cold fixed mould 104. The moulding cycle then returns back to the first step, shown in FIGS. 4(g) and 4(a), repeating the moulding cycle by injection of the material to be moulded between the hot fixed mould 102 and the hot shuttle 106 and simultaneous cooling of the previous moulded foam body 110' between the cold fixed mould 104 and the cold shuttle 108 on side B.

This embodiment provides a convenient engineering solution as a modification of a known Hirsch process which permits highly efficient production of foam bodies having a predetermined anisotropy index, and preferably an anisotropy index of greater than 1.1, at a high production rate.

In a yet further embodiment of the present invention, a preliminary moulded foam body may be initially formed in a first mould and then allowed to cool, to form an intermediate product. The cooled foam body may then be reheated and remoulded again under vacuum in a second larger mould so as to cause stretching of the initially moulded foam body in a selected direction. This produces a final product having a predetermined foam cell anisotropy index.

Such an two-step reheating process is less desirable than a single one-step process, such as the modified Hirsch process described above, which is a continuous process in which the polymer of the preliminarily moulded intermediate product is still above its glass transition temperature at the beginning of the subsequent selective expansion step to induce the desired anisotropy index into the final foam body.

It is possible controllably and efficiently to produce a high anisotropy index foam using the vacuum expansion mould in accordance with the preferred embodiments of the present invention, the anisotropy index varying from 1 to 1.7. The foam tends not to conform well to the mould at anisotropy indexes higher than 1.7, and the sheet density tends to have reduced uniformity, at anisotropy indexes higher than 1.7. These material properties could result in manufacturing and performance problems when the sheet is cut into smaller sheets, or sanded, in any subsequent finishing steps.

In the preferred process of the present invention, an anisotropy index (A.I.) of from 1 to 1.4 is obtained. During experimental work, it was found that the application of a vacuum was more important than the expansion time or the expansion temperature for achieving a desired high anisotropy index. Furthermore, high values of foam density can be reduced with the application of a vacuum during cooling, so as to further expand the foam in a selected vertical and thickness direction.

It was particularly found that the compression strength and compression modulus can be increased with application of vacuum cooling to achieve an increased anisotropy index. Typically, to achieve a 5% increase in the following properties the anisotropy index should be above the respective specified value: Compression strength; AI >1.10; Compression modulus, AI >0.79; Shear strength, AI >0.93; Shear modulus AI >1.12; and Shear Elongation AI >0.96. Typically, to achieve a minimum increase of 5% in all the above specified mechanical properties, an anisotropy index of a minimum value of 1.12 is required. Although the compression strength and modulus of a foam can particularly be increased by increasing the anisotropy index, typically however, the shear properties are less increased or sometimes not significantly increased.

In the present invention, the anisotropy index was determined by microscopic analysis of the cellular structure in three orthogonal directions. In particular, for each foam sample to be analysed to determine the anisotropy index, each face of the block, min the x, y and z directions, was prepared by rough grinding with 240 grit paper (wet), followed by a light grind with 2400 grit (wet) using a polishing wheel. Care was taken to ensure the x, y and z surfaces were approximately perpendicular to each other and flat after grinding. Each face then had a smear of ink (standard ballpoint pen ink applied with the end of a fingertip) which was previously found to assist in gaining contrast on the images of the foam structure.

Using an Olympus SZX9 binocular microscope and Struers Scentis image analysis software, average grain sizes were calculated using the intercept method (from DeHoff & Rhines, 1968), which specifies:

$$Lx=1.5/Nc$$

where Lx=average cell diameter in the X direction and Nc=number of cells per unit length of a straight line drawn parallel to the principal direction X.

The cell diameter values in the Y and Z directions were similarly determined for the values Ly and Lz, where Nc is the number of cells per unit length of straight line drawn parallel to the respective principal direction Y or Z.

The anisotropy of the cells was calculated by considering the ratio of L in each principal direction. Accordingly, for AI in the rise direction; AI=Lz divided by average of Lx and Ly.

The data was validated by checking values of X taken from opposite faces of a cubic block, and the data was found to be reliable.

It was found that there was a good correlation between the bulk anisotropy index determined by measuring the dimensions of the embryo and the final foamed product and the microscopic cell anisotropy index measured using the above process.

The anisotropy index was found to be rather uniform throughout the foam sheets that were microscopically analysed, although the foam samples had had their originally moulded surfaces trimmed away prior to microscopic analysis. It is however possible that the cell structure at the very edges/surfaces of the originally moulded foams would be different form the cell structure at the centre of the foamed body.

The present invention id further illustrated with reference to the following non-limiting example.

Example 1

In this example, foam embryos of a styrene-acrylonitrile (SAN) polymer, similar to the polymer employed to manufacture the applicant's Corecell (Registered Trade mark) structural foam were prepared. The embryos also contained a blowing agent, comprising azobisisobutyronitrile (AZDN) and acetone. The embryos were cut to a predetermined rectangular shape and size and mounted within a mould, disposed within a hydraulic press, that was shaped and dimensions so as to determine a maximum dimension for the width and length, in the horizontal direction, of an expanded foam body formed within the mould from the embryo. In order to reach the desired value of anisotropy index, a restriction system was provided to prevent any gain in length and width of the embryo sample while it was heated and expanded to form the expanded foam body. The samples were left in the hydraulic press for a certain period at a given temperature to achieve the required expansion defined by the limits of the mould cavity.

In this example, the mould did not restrict the maximum dimension for the height, in the vertical direction of an expanded foam body formed from the embryo. The mould containing the embryo was disposed within an oven heated to 135° C. The oven temperature was then increased up to 150° C. The embryo commenced expansion within the oven, and when the expanded foam had reached the targeted width defined by the mould, the expanded foam block within the mould was removed from the oven and put inside a vacuum cooling chamber.

The vacuum chamber had the vertical thickness of the cavity shimmed to form a specific cavity height to provide a target anisotropy index of 1.20. A time delay of no more than 2 minutes was permitted between the foam block exiting the oven and initiating of the vacuum application to the foam. Therefore the material of the foam was above its glass transition temperature on entry into the vacuum cooling chamber. The foam accordingly continued to expand, at least during the initial stages of the vacuum cooling step, in the thickness direction to a maximum dimension defined by the vertical thickness of the cavity. The foam was cooled within the vacuum cooling chamber for a period of 20 minutes. The vacuum cooling temperature was from 20 to 25° C. The expanded foam block was then removed from the vacuum cooling chamber, measured, sanded and squared off, then re-measured and the mechanical properties were tested.

The same polymeric material manufactured to form an expanded foam body by a single foam expansion process not employing final vacuum cooling step had a density of 94 kg/cubic meter and an anisotropy index of 0.96. Such a conventional foam had a compression strength of 1.30 MPa, a compression modulus of 56 MPa, a shear strength of 0.99 MPa and a shear modulus of 34 MPa.

In accordance with this Example, the corresponding minimum values obtained by experiment using the process described above, with an applied vacuum of $68 \times 10^3$ $N/m^2$ (20 in of Hg), corrected to provide a foam density of 94 kg/cubic meter, were as follows: compression strength 1.50 MPa, compression modulus 78 MPa, shear strength 1.16 MPa, shear and shear modulus 36 MPa. These values represent, as compared to the conventional polymer foam having the same chemical composition, a percentage improvement in these mechanical properties of: 15% for the compression strength, 39% for the compression modulus, 17% for the shear strength and 6% for the shear modulus.

It may be seen therefore that the introduction of anisotropy into the foam structure can greatly increase the mechanical properties of a structural expanded polymeric foam. This example shows that the mechanical properties obtained by cooling a foam, in particular a structural foam composed of a styrene-acrylonitrile (SAN) polymer, under vacuum after the expansion are improved. For composite sandwich panels, the shear modulus and the shear strength are the most important material parameters to provide the foam core with the necessary mechanical strength, and the shear and compressive modulus determine the resistance of the sandwich panel against buckling. The increased anisotropy index of the structural foam increases these important mechanical properties for a given foam density, or alternatively provides the equivalent mechanical properties for a lower density of a given foam composition.

A further benefit was that the shear elongation was maintained at a generally high value because the styrene-acrylonitrile (SAN) polymer provides good toughness properties (i.e. low brittleness and high resistance to cracking and fracture). However, in contrast, PVC cross linked foams, which usually have higher specific properties, tend to exhibit a lower shear elongation, manifested as increased brittleness, than the SAN foam of similar density. By using the increased anisotropy index to improve the mechanical properties, in particular the increased shear modulus, shear strength, and compressive modulus, while maintaining good shear elongation, a styrene-acrylonitrile (SAN) polymer foam can provide an improvement over known polyvinyl chloride (PVC) polymer foams.

This means that where a cross-linked PVC foam may be specified for a particular application as a structural foam for use in a sandwich composite panel for its good shear strength and shear modulus properties, as well as its low density, but the material is compromised by high brittleness. The provision of a SAN foam having improved shear modulus and shear strength at lower density by increase of the anisotropy index of the structural foam provides a SAN foam that can better compete against the PVC foam and also provide better shear elongation as compared to the PVC foam. FIGS. 6, 7, 8 and 9 are graphs showing the above-described relationship between mechanical properties (shear strength and shear modulus) and density for various structural foams, namely a typical known PVC foam (in particular a PVC foam sold by Diab, Inc, under the trade name "Divinycell H grade"), a typical known SAN foam (in particular a SAN foam sold by the applicant and its related company SP Systems under the trade name "Corecell T" (Corecell is a Registered Trade Mark) and a SAN foam having the same chemical composition as the "Corecell T" foam but with an increased anisotropy index produced in accordance with the present invention. This technical improvement accordingly opens up new commercial opportunities for SAN foams to compete with conventional PVC foams for use as a core material in sandwich composite panels.

Figure 6:
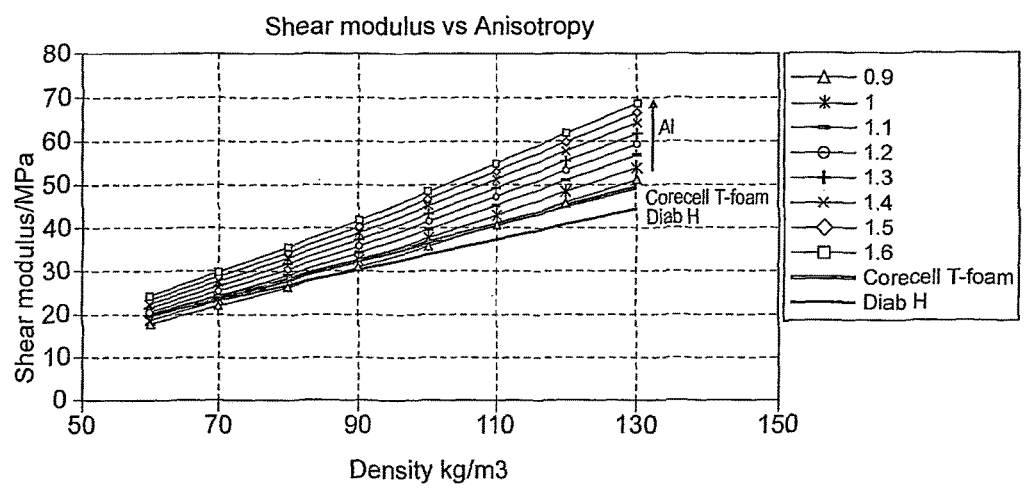
FIG. 6 is a graph showing the relationship between the shear modulus properties and density for various structural foams.

From FIG. 6 it may be seen that the shear modulus of the SAN foam generally increases with increasing anisotropy index. Also, at a given foam density, the shear modulus is generally higher for the higher A.I. (A.I. greater than about 1.2) SAN foams than for both the known PVC foam and the known SAN foam.

Figure 7:
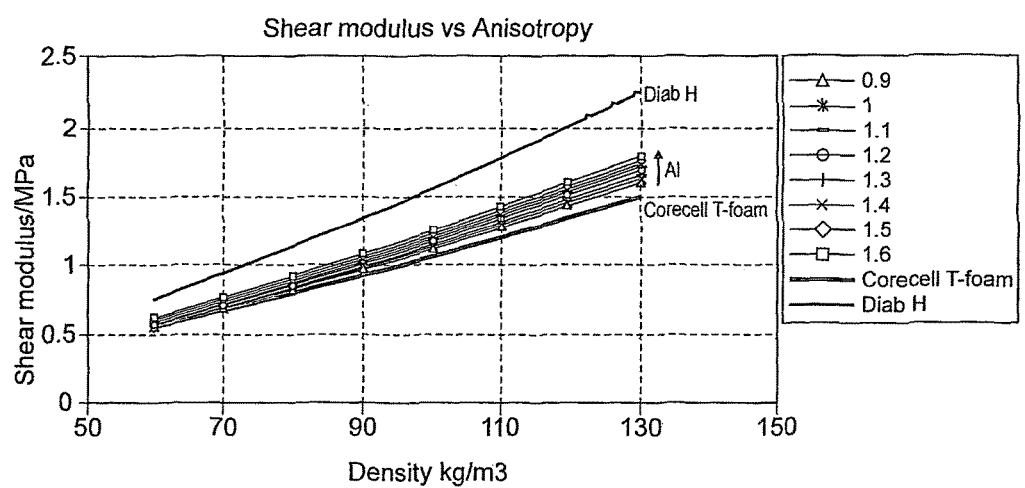
FIG. 7 is a graph showing the relationship between the shear strength properties and density for various structural foams.

FIG. 7 shows that the shear strength of the SAN foam generally increases with increasing anisotropy index. At a given foam density, the shear strength is generally higher than for the known SAN foam, but lower than for the known PVC foam.

Figure 8:
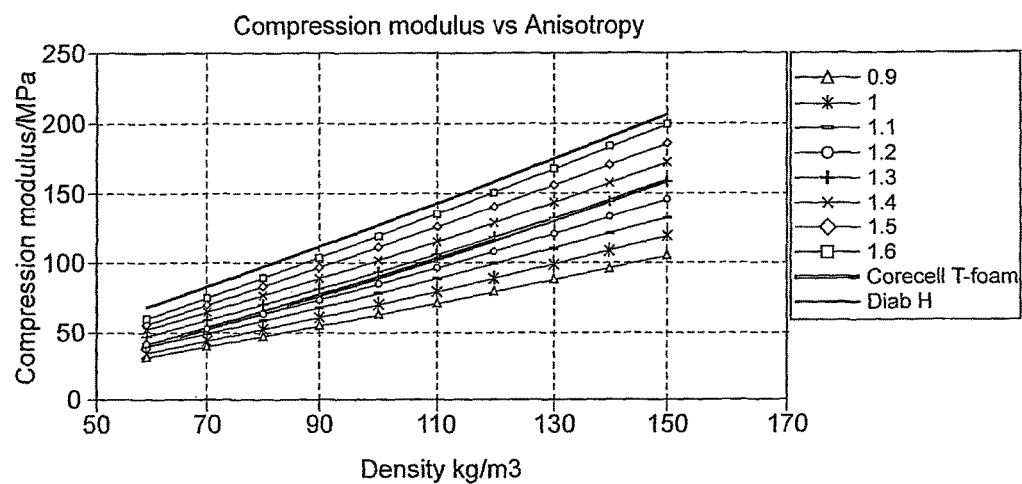
FIG. 8 is a graph showing the relationship between the compressive modulus properties and density for various structural foams.

From FIG. 8 it may be seen that the compression modulus of the SAN foam generally increases with increasing anisotropy index. At a given foam density, the compression modulus is generally higher for the higher A.I. SAN foams (A.I. greater than about 1.3) than for the known SAN foam, but lower than for the known PVC foam, although at high A.I. of about 1.6 the compression modulus of the SAN foam generally approaches that of the known PVC foam.

Figure 9:
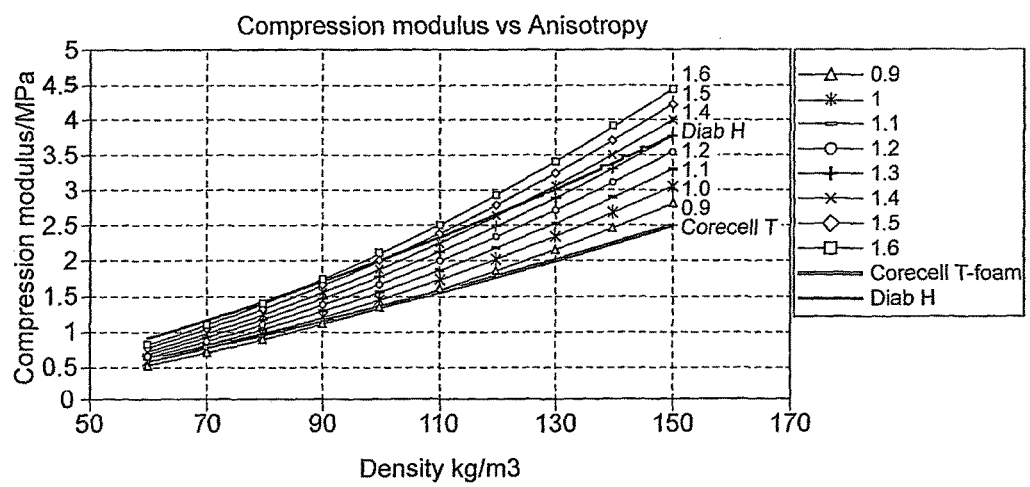
FIG. 9 is a graph showing the relationship between the compressive strength properties and density for various structural foams.

FIG. 9 shows that the compression strength of the SAN foam generally increases with increasing anisotropy index. At a given foam density, the compression strength is generally higher for the higher A.I. SAN foams (A.I. greater than about 1.1) than for the known SAN foam. At high A.I. of about 1.4 the compression strength of the SAN foam generally exceeds that of the known PVC foam, particularly at higher foam densities.

The invention claimed is:

1. A method of manufacturing a structural foam body having an anisotropic cell structure, the method comprising the steps of:
   (a) forming an initial foam body by conducting a first, primary expansion step in which heat is applied to an unfoamed polymer embryo at an elevated temperature above the glass transition temperature Tg of the polymer so as to expand the polymer embryo into the initial foam body, wherein the embryo comprises styrene-acrylonitrile as the polymer and a blowing or expansive agent; and
   (b) forming a final foam body having an anisotropic cell structure from the initial foam body by conducting a second expansion step in a vacuum chamber, by:
      (i) in a first phase of step (b), applying a negative pressure anisotropically to the initial foam body in the vacuum chamber while the polymer remains above the glass transition temperature Tg of the polymer from heat retained from the heat of step (a), the polymer cooling during the first phase, so as to expand the initial foam body into the final foam body having the anisotropic cell structure, and
      (ii) in a second phase of step (b), cooling the final foam body in the vacuum chamber under the anisotropically applied negative pressure to a temperature below the glass transition temperature Tg of the polymer so as to set the anisotropic cell structure,
   wherein the initial and final foam bodies are each in the form of a sheet each having a thickness direction between opposite major surfaces thereof and wherein an anisotropy index of the anisotropic cell structure is provided such that cell dimensions in the thickness direction of the final foam sheet are from 1.1 to 1.4 times greater than cell dimensions in a width or length direction of the final foam sheet as a result of the negative pressure being applied in the thickness direction of the initial foam sheet.

2. A method according to claim 1 wherein phase (i) of step (b) is conducted in a mould between opposite mould surfaces, the negative pressure holding the opposite major surfaces of the initial foam sheet adjacent to respective ones of the opposite mould surfaces.

3. A method according to claim 1 wherein in phase (ii) of step (b), the negative pressure acts to prevent collapse of the foam under the action of gravity.

4. A method according to claim 1 wherein phase (i) of step (b) further comprises applying the negative pressure across the thickness direction of the initial foam sheet to stretch the cells of the initial foam sheet in the thickness direction so that the thickness of the final foam sheet is greater than the thickness of the initial foam sheet.

5. A method according to claim 1 wherein the negative pressure is at least 15 N/m$^2$ absolute.

6. A method according to claim 1 wherein step (a) further comprises forming the initial foam body in an oven at the elevated temperature and transferring the initial foam body from the oven to the vacuum chamber for conducting step (b).

7. A method according to claim 6 wherein the transferring step from the oven to the vacuum chamber occurs within a period of no more than about 3 minutes.

8. A method according to claim 1 wherein the negative pressure under step (b) is applied for a period of at least 15 minutes.

9. A method according to claim 1 wherein the negative pressure under step (b) is applied at a temperature of up to 30° C.

10. A method according to claim 1 wherein the vacuum chamber is a mould having an upper moulding surface and a lower moulding surface which are mutually spaced by a first predetermined distance defining the thickness of the final foam sheet.

11. A method according to claim 10 wherein in step (b), the initial foam sheet is disposed with the two opposite major surfaces of the of the initial foam sheet respectively facing the upper and lower moulding surfaces of the mould.

12. A method according to claim 11 wherein during step (a) the initial foam sheet is formed in a press having upper and lower initial moulding surfaces spaced by a second predetermined distance defining the thickness of the initial foam sheet.

13. A method according to claim 11 wherein in step (a), area dimensions of the initial foam sheet are predetermined and comprise a first sheet extent parameter, and in step (b), area dimensions of the final foam sheet are predetermined and comprise a second sheet extent parameter, and a ratio of the second sheet extent parameter to the first sheet extent parameter is selected to provide the cell anisotropy index of 1.1 to 1.4.

14. A method according to claim 1 wherein step (a) is carried out in an initial mould and step (b) is carried out in a final mould as the vacuum chamber.

15. A method according to claim 1, wherein:
- in step (a), the embryo is expanded substantially isotropically to form the initial foam body to have an isotropic cell structure; and
- in step (b), the initial foam body is expanded anisotropically in the thickness direction, and the negative pressure which is applied anisotropically to the initial foam body applies an expanding force in the thickness direction to provide the final foam body with the anisotropic cell structure.

16. A method according to claim 15 wherein step (a) is carried out in a first mould defining a first mould cavity having a first volume and a first distance in the thickness direction and step (b) is carried out in a second mould as the vacuum chamber defining a second mould cavity having a second volume larger than the first volume and a second distance in the thickness direction larger than first distance.

17. A method according to claim 15 wherein steps (a) and (b) are carried out in a common mould as the vacuum chamber having a movable mould member, the movable mould member being selectively movable in a selected direction from a first position, defining for step (a) a first mould cavity volume having a first distance in the selected direction, to a second position defining for step (b) a second mould cavity volume having a second distance in the selected direction, the second distance being larger than first distance.

18. A method according to claim 15 wherein in step (b), the negative pressure is applied across the thickness direction of the initial foam body and acts to stretch cells of the initial foam body in the thickness direction of the initial foam body so that the thickness dimension of the final foam body is greater than a corresponding thickness dimension of the initial foam body.

19. A method according to claim 15 wherein the negative pressure under step (b) is applied for a period of at least 15 minutes.

20. A method according to claim 15 wherein the negative pressure under step (b) is applied at a temperature of up to 30° C.

21. A method according to claim 15 wherein the negative pressure is at least 15 N/m² absolute.

22. A method according to claim 15 wherein the final foam body has a greater body thickness than the initial foam body.

23. A method according to claim 15 wherein the expanding of step (a) is carried out in an initial mould and step (b) is carried out in a final mould as the vacuum chamber.

* * * * *